Oct. 10, 1967

P. L. FORIS 3,346,385

PROCESS FOR PHOTO-ENGRAVING BY USE OF PHOTO-CHROMIC DYE AND PRODUCT

Filed Jan. 16, 1964

OPTIONAL STEP

INVENTOR
PETER L. FORIS

BY

Louis A Kline
Justin S Compton

HIS ATTORNEYS

United States Patent Office 3,346,385
Patented Oct. 10, 1967

3,346,385

PROCESS FOR PHOTO-ENGRAVING BY USE OF PHOTO-CHROMIC DYE AND PRODUCT

Peter L. Foris, Dayton, Ohio, assignor to The National Cash Register Company, Dayton, Ohio, a corporation of Maryland Filed Jan. 16, 1964, Ser. No. 338,135
20 Claims. (Cl. 96—36)

Figures 1, 2, 3, 4:
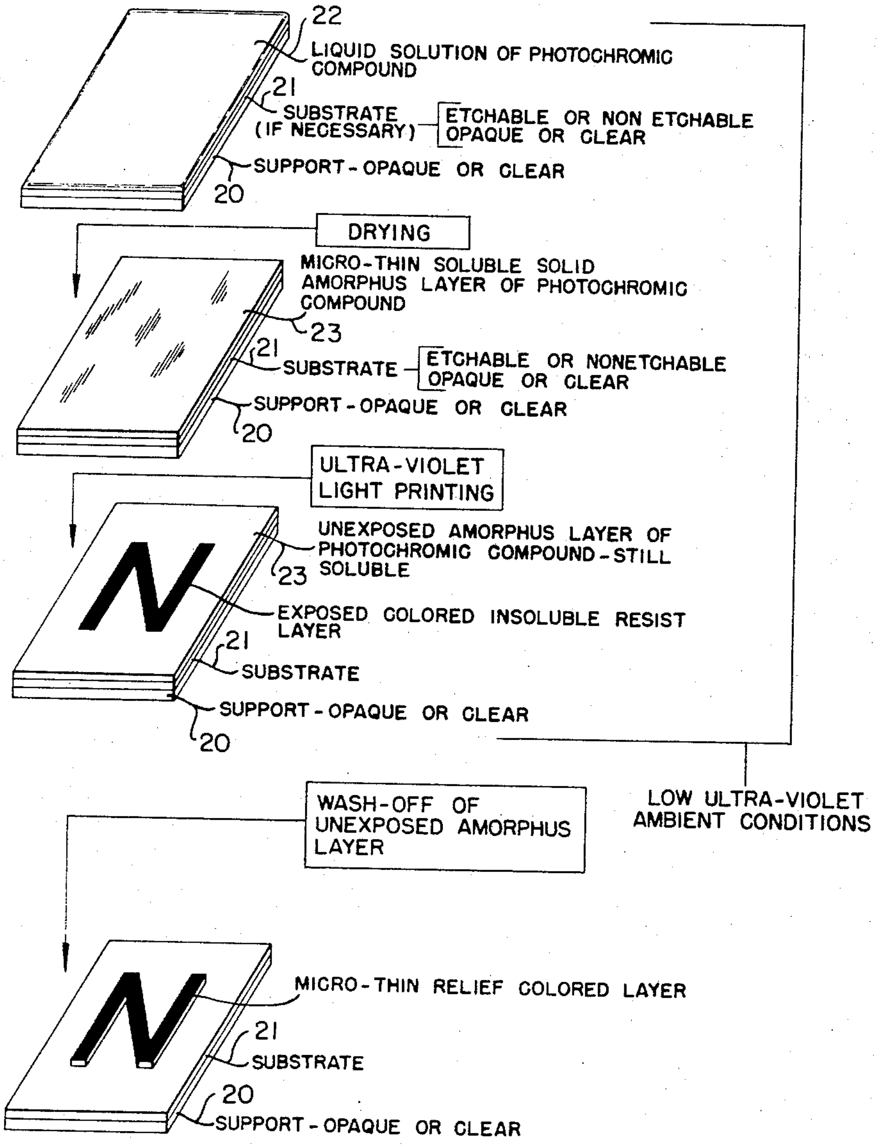

This invention relates to amorphous photochromic layers on substrates, to their use in image formation for recording data, and to their use in controlling various treatments of the substrate material.

The invention provides for the formation of ultra-thin amorphous layers of photochromic material on a substrate having a support function, or other function, such layers being formed by deposit from a solution of photochromic material in a readily evaporable solvent or by deposit and condensation of a vapor form of the photochromic material onto the substrate. The invention provides for the differential treatment of such layers by certain bands of the electro-magnetic spectrum to render the layers differentially soluble areawise, according to a desired image pattern, with accompanying color change. The invention further relates to treatment of the ultraviolet-light-exposed or unexposed photochromic material to aid in processing the substrate or to enhance the utility and permanence of the photochromic material itself.

Such image portions of the photochromic layers are insoluble with respect to certain liquids which are used to wash off or extract the background unexposed parts or which etch certain substrate material, but on the other hand such image portions in certain instances, after treatment, may be washed off or extracted with certain liquids which do not have a like effect on the unexposed areas of the so-treated photochromic layers. In addition, molecules in the areas exposed to ultraviolet light which have not been affected thereby may be extracted from amongst those that have, to render the images uncontaminated by unexposed molecules and, hence they are more stable.

Such devices, materials, and processes provided by this invention and are suitable for making light-control means in the form of projected image-forming masks or reflecting surfaces, are capable of forming images that resist etching fluids used for etching substrate materials, or for the differential processing of the substrate materials as determined by the image-delineating resist areas.

As it is well known to reverse the effect of ultraviolet light on a photochromic material layer by application of radiation longer than 450 millimicrons, the resist image may be made by coloring the whole area with ultraviolet light and thereafter forming the image contours by erasing light.

Photochromic material as referred to herein is a spiro-carbon-containing organic compound material, involving one or a mixture of similar or dissimilar compounds, that respond in amorphous solid state to ultraviolet light by exhibiting a change of molecular configuration subject to inherent thermal reversal due to environmental temperature, such change in configuration being accompanied by a change in light absorption and solubility characteristics. Generally, photochromic compounds change from a non-polar normal form to a polar form upon being energized by ultraviolet light. The exposed, more polar photochromic compound is less soluble in non-polar organic solvents. Both the exposed and unexposed photochromic compounds are soluble in organic polar solvents at all times. Moreover, alone or in combination, it has been found, these photochromic materials can be made to form continuous amorphous layers that are non-penetrable by various extraction and etching solvents to which the substrate materials may be susceptible.

These amorphous layers have no optical graininess such as is the case with crystalline layers, and are capable of forming continuous amorphous, solvent-resistant layers, in solid states, as thin as one micron, without accessory binder material. Hence, an image made on such a layer can be made with a precision limited only by the molecular size of the photochromic compound, or compounds, used and by the thickness of the layer.

By this invention, the combination of characteristics of these amorphous photochromic layers provides for optically making a resist image in a uniquely precise and economical manner.

It is proposed to employ one or more substrate materials either in respect to area or depth, and these substrate materials are chosen for their characteristics as support materials, their chemical and electrical properties, and their energy transmission and radiation properties, among others. These properties, in combination with the image layer formation control properties of the photochromic material, open the door to a fantastic multiplication of various useful processes and articles of manufacture such as data recording and data records; printing plates, electric and electronic circuits, particularly micro-circuits and circuit elements; light-control masks; integrated electrical, electronic, optical, and combined integrated components; decorations; film transparencies; multiple color control for projected light; and surfaces with various areas and layers identified by their own individual characteristic response to energy. Such materials for substrates, while working in combination with the photochromic layers placed thereon, need have no special characteristics except that of ability to persist in contact with one against the other as long as required. Thus, metals, inorganic solids, organic solids, and temporarily solid material may be used as substrate material.

For the preferred embodiment and other embodiments of the invention herein disclosed either glass or metal will be disclosed as the substrate material as between them they exhibit optical and electric properties, and energy transmission in practically all phases. For the preferred and other embodiments of the invention photochromic material thermally stable for long periods of time at normal room temperature (20°–25° centigrade) will be disclosed. But such preferred disclosure is not to be deemed limiting as circumstances may require warmer or colder environments of use of the materials, and departure from the use of metal or glass substrates may be made at will. The term "metals" includes in scope alloys, mixtures, compounds and fabrications containing metal ions, atoms, or molecules. The term "glass" includes glass-like materials of homogeneous or composite nature such as ceramics or minerals, and includes self-supporting polymer films.

In general, the photochromic layers provided by this invention may have precise images formed thereon, or therein by optically-controlled ultraviolet radiation applied through the use of a lens system or stencils, or both, such images being precisely limited areawise only by the resolution of the optical system and the thickness of the layer or layers.

It has been found that the thin layers of photochromic compound material may be deposited on the selected substrate by applying a comparably thin liquid solution thereof, in a readily evaporable solvent, to the layer-receiving surface of the substrate and allowing the solvent to evaporate. The solvent may be a readily-evaporable non-polar hydrocarbon liquid if the photochromic material is in the non-polar state, or a polar solvent if the material is in a polar state. Certain well-known photochromic compounds which are derived from the condensation of substituted Fischer's base with substituted salicylaldehyde will dry from readily-evaporable hydrocarbon solvent solutions into amorphous layers, either alone or in combination, and are stable in continuous solid amorphous state form for some hours at room temperature.

If the selected dye does not "want" to form an amorphous continuous layer alone, as would be indicated by a cloudiness of the dried solid deposit, an additive may be added to the solution in the nature of a closely related derivative that has the same photochromic properties but which inhibits the crystalline alinement of the deposited molecules. For instance, if the well-known photochromic material made by condensing Fischer's base with salicylaldehyde substitute so as to form

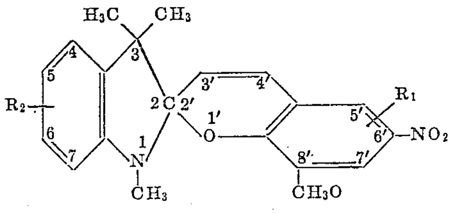

will not yield an amorphous deposit from solution as determined by the cloudiness test, owing to the extreme purity of the compound or its aging behavior, then there may be added thereto in solution an amount of the 5'Br, 6'$NO_2$, 8'$CH_3O$ derivative sufficient to form a molecular mixture that forms a continuous non-crystalline layer without interfering with the photochromic and solubility characteristics associated with each individually. Indeed, even a slightly impure condensation product may work to produce a better amorphous film from solution than a completely purified homogeneous product, as is well-known to those skilled in the art attempting to prepare purely crsytalline organic compounds. Some of the purified compounds readily form an amorphous deposit layer without addition materials but resort to addition agents may be required if there is a tendency to crystallize immediately or over a certain period of time it is desired to keep the coated substrate in condition for use to form resist images with ultraviolet radiation.

A large number of these Fischer's Base/salicylaldehyde condensation compounds are described in British Patent 887,958 (1960), in U.S. Patent No. 3,100,778 which issued Aug. 13, 1963, and in U.S. Patent 2,953,454, which issued September 1960 on the application of Elliott Berman.

It has been found that among these compounds are those that alone will form amorphous solid layers from the evaporation of the solvent from thin liquid solution layers, specifically the following derivatives where $R_1$ and $R_2$ if not substituted are deemed to be hydrogen.

(I) $R_1$=6'$NO_2$,8'$OCH_3$
(II) $R_1$=5'Br,6'$NO_2$,8'$OCH_3$
(III) $R_1$=6'$NO_2$; $R_2$=5$CH_2CH_2OH$
(IV) $R_1$=6'$NO_2$,8'$OCH_3$; $R_2$=5$CH_2CH_2OH$
(V) $R_1$=5'Br,6'$NO_2$,8'$OCH_3$; $R_2$=5$CH_2CH_2OH$
(VI) $R_1$=5'Br,6'$NO_2$,8'$OCH_3$; $R_2$=7 phenyl These compounds, even though alone producing amorphous layers from solution may be used in combination to improve the stability of them against crystal growth—the steric differences of the molecules supposedly inhibiting crystal formation, as do the residual impurities of manufacture if not completely eliminated.

The reaction of these photochromic materials to ultraviolet light in the amorphous form has been known, but the manipulation of these compounds in the formation of amorphous layers on substrates and the formation of images thereon to be used as resists, by differential application of ultraviolet light thereto followed by a wash-off and extraction step, is new. Also new is the discovery of the property of such layers to withstand liquid etching solutions that may be used to attack selected substrates, as is the new conception of such as of use in making high resolution micro-electric circuits, micro-electronic components and micro-images of data by proper selection of cooperating materials and processing steps.

Also useful photochromic materials are the naphthobenzo derivatives of the named nucleus, such as

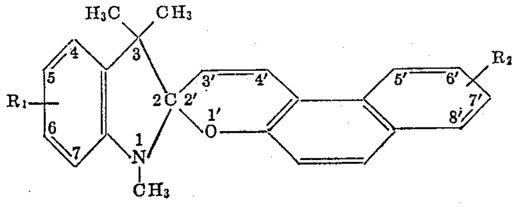

especially where $R_1$=4,7 dimethoxy; or
$R_2$=7'$NO_2$

All of the named derivative compounds act singly to produce amorphous layers. Other derivatives in combination also are eligible as all are photochromic and a change in solubility is inherent in their change from the non-polar state to the polar state through the making and breaking of 2'-spiro-carbon to oxygen bond. The effectiveness of the amorphous layers of these compounds as resists or visible color forms will vary, and the variations themselves spell-out to those skilled in the art their conditions of use as resists to particular conditions involving substrate material and associated applied etching fluids including liquids and gases.

Generally, the uncolored compounds which have not been switched to the colored state are more soluble in non-polar hydrocarbon solvents than the same compounds in the colored state. This allows the uncolored portions of the photochromic layers to be washed away or extracted by the non-polar solvents without affecting the colored areas, except as next explained. Because, in an area exposed to ultraviolet light the molecules of the photochromic material are switched molecule-by-molecule, according to the incident applied energy, a given area that is held to be in a colored condition, is not wholly so as there remain uncolored molecules. Such mixture of molecules in both configuration states is not incompatible with stability of the colored molecules, but such stability is enhanced by the extraction of the non-polar molecules from amongst the colored polar molecules by the same non-polar solvent used to extract or wash off the background area. Because there is no binder material present, the image area after being extracted of the non-polar molecules is more stable thermally than before.

Generally, the solvents that will distinguish between the non-polar colorless form of the photochromic material and the polar colored form thereof are the saturated hydrocarbon aliphatic and alicyclic liquids such as hexane, heptane, octane, cyclohexane, and methyl cyclohexane, and also petroleum ethers of 30°–60° centigrade boiling point range, among others. These solvents will dissolve the non-polar spiro-pyrans of the reaction of substituted Fischer's base with substituted salicylaldehydes, as disclosed, but not the polar colored forms thereof. The same photochromic materials in the colored and uncolored states cannot be distinguished by polar solvent liquids such as benzene, toluene acetone, methyl ethyl ketone and other ketonic solvents, ester solvents and alcohols.

If the molecules in the colored state are treated with hydrochloric acid vapors they will be converted from a normal blue color to a yellow color associated with the acid complex thereof, in which acid-complex state they will resist aromatic hydrocarbon solvents. Hence, the image forming molecules that have been colored can sense the difference not only between polar and non-polar hydrocarbon solvents, but between aromatic and non-aromatic polar solvents. This yellow condition may be reversed by after-treatment with ammonia vapor. This secondary yellow condition may be used as a substrate for a new amorphous layer of photochromic material if desired, or may be used for a more insoluble resist to certain etching solutions in a manner to be described.

The halogen acid complex of the unexposed photochromic layer is light yellow and photosensitive and yields on exposure to ultraviolet light a deep yellow form identical with the complex formed by treating the exposed colored form of the amorphous layer with halogen acid fumes.

Aliphatic and alicyclic hydrocarbon solvents will not distinguish the hydrochloric acid complexes of these compounds in the colored and uncolored state, being insoluble therein.

Dilute aqueous acidic solutions will wash off the colored forms of these compounds. Of the hydrochloric acid-converted photochromic materials, the exposed colored portions may be washed off with water leaving unexposed molecules.

The colored form of the photochromic amorphous layers made from the specific compounds named is resistant to ferric chloride used in etching copper, stainless steel, and other metal alloys, and is resistant to palladium chloride used in the etching of aluminum, all of which metals may be used as substrates or in the substrates. The colored state also is resistant to an etching aqueous solution of hydrofluoric acid of 5% concentration, the exposed plate having previously been treated with a ferric chloride solution to "harden" the exposed photochromic layer against damage.

*Example I*

A typical and preferred embodiment of the invention will now be described with reference to the drawing in which a support plate of glass 20, is shown provided with a thin substrate 21 of copper, on which is placed a layer 22 (FIG. 1) of a 10% liquid solution of the photochromic material in benzene, the photochromic material being selected from compounds I to VI alone or in any combination in any proportions. The photochromic material solution is applied to the exposed substrate surface, after it has been cleaned so a good wetting thereof occurs. The amount of liquid solution supplied is gauged by the thickness of the amorphous solid layer 23 (FIG. 2) desired or required. While a thin layer, in dried state, of 1 micron is desirable for an ultra-fine resolution product, a heavier and thicker film may be required where rougher handling or etching conditions are to follow. The concentration of photochromic material in solution may be reduced or increased to bring about the desired result in thickness, but a 1 to 10 percent concentration seems to work best. The liquid layer preferably is dried at room temperature in air, but other conditions of drying to prevent crystallization of the dried layer may be used as the occasion warrants.

Figure 5:
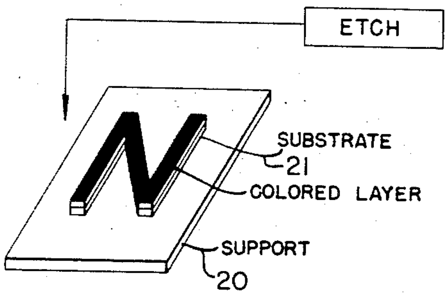

Next, the image 24 (FIG. 3) is formed by application of ultraviolet light of a wave-length of 375–400 millimicrons, by use of an optical light mask (stencil), or by projection of a stationary or moving beam of the light thereon, or by such means acting together. If the whole photochromic layer 23 is to be turned to the colored state first, such is done by flooding the surface thereof with the specified ultraviolet light. Such color, in any case, is formed in a small fraction of a second, so there is no visibly perceptible time consumed in the formation of the image or the coloration of the whole plate. The plate now is washed with a non-polar solvent such as methyl cyclohexane, which leaves the image in colored form (FIG. 4) protecting the copper substrate background in registry therewith. If the optional step of etching away the exposed copper is to be undertaken, an aqueous ferric chloride solution is used. The top coating of colored photochromic material (FIG. 5) over the image of copper may be removed, after the etching step, by a polar solvent to expose the copper image which may be used as an electric conductor, photographic mask, or for decorative purposes.

*Example II*

In this example the same photochromic materials are used as in the preferred example except that an aluminum substrate is used instead of copper and the etching solution is palladium chloride in 0.5% aqueous concentration. As an evaporated deposit layer substrate, aluminum has some advantage over copper in use on semi-conductor support material such as semi-conductor material in the nature of silicon-products which are "poisoned" by copper. It is evident that substrate images of electrically-conductive material can be formed into circuits, and circuit elements, in micro-fine precise patterns directly resting on supports that are used for other purposes, so as to form integrated useful structures so-prevalent in modern electro-mechanical-optical devices.

*Example III*

In this example the selected photochromic material is laid down from solution, in a first step, as an amorphous layer on a self-supporting glass substrate to be etched. Next an image is formed with ultraviolet light followed by a step of washing off the background of unexposed material; and finally etching the background with hydrofluoric acid of 5% aqueous concentration. The image background then may be removed with a non-polar solvent. If trouble is encountered in the resistance behavior of the photochromic image as concerns the etching fluid, it may first, before the etching step, be treated with a 10% aqueous concentration of ferric chloride. This action of ferric chloride aqueous solution in insolubilizing the colored part of the photochromic image was discovered from its use in the etching of copper substrates. The exposed glass substrate may be etched with an aqueous solution of hydrofluoric acid, followed by a wash-off of the image layer with a polar solvent.

*Example IV*

In this example the objective is to make a visually transparent electric circuit on a substrate of glass or equivalent transparent or opaque self-supporting material. First, a tin-oxide substrate of desired thickness is formed on the support. Next, an amorphous photochromic layer is laid down on the tin-oxide coated substrate layer, to be etched, an image formed thereon with ultraviolet light in the manner selected, in the configuration of the electric circuit; and the background washed-away with a solvent as described in previous examples. This substrate with the image thereon is submerged in an aqueous suspension of finely-divided zinc metal powder, the dispersion being supplied with a few drops of 10% hydrochloric acid aqueous solution, to reduce the tin-oxide of the background to metallic tin, the zinc providing for the formation of the necessary nascent hydrogen. The substrate then is cleaned of zinc dust and placed in concentrated hydrochloric acid solution which etches the tin but leaves the tin oxide image under the photochromic image area intact. The photochromic image layer then may be removed, if desired, to leave the tin oxide circuit exposed.

*Example V*

A cadmium sulfide etched pattern may be made by coating a glass substrate with cadmium sulfide, followed by an overcoating consisting of an amorphous layer of the selected photochromic material, on which photochromic layer an image is formed with ultraviolet light. The background photochromic layer is washed off, exposing the cadmium sulfide underneath. The cadmium sulfide background is exposed to fumes of concentrated hydrochloric acid which convert it to cadmium chloride which is washed off in distilled water, leaving the cadmium sulfide image under the photochromic layer as a photoconductor element. As in the other examples, the photochromic material forming the image may be washed off, leaving the counterpart image itself as exposed cadmium sulfide.

*Example VI*

In this example it is contemplated to perform on a substrate a series of patterned operations in sequence, each pattern being derived from a photochromic layer applied especially for that operation, subjected to pattern-forming ultraviolet light radiation for that operation, background extracted to remove unconverted photochromic material for that operation, followed by the operation on the substrate as controlled by the resist image left thereon. In this way a series of operational patterns may be laid down on the same substrate in a functional overall pattern where the individual patterns cooperate due to their mutual position on the substrate. Particularly, silicon wafers, which spontaneously form oxide surfaces in air, could be used as a typical substrate material which it is desired to use as a base for forming silicon semi-conductor patterns by epitaxial diffusion from the surface of the necessary impurity in vapor form to form either a P-junction or an N-junction, as disclosed in United States Patent 3,047,438 which issued July 31, 1962. The oxide-coated wafer, which may have a thickened oxide layer formed thereon, is supplied with a first amorphous photochromic layer which has the first pattern impressed thereon with ultraviolet light followed by wash-off and extraction of the background and unexposed material. The background silicon dioxide layer is subjected to hydrogen fluoride gas which converts the oxide to gaseous silicon tetrafluoride to uncover the silicon surface which, in the uncovered condition, may be treated to an epitaxial diffusion of the selected impurity as controlled by the image-representing and resistant silicon-dioxide layer remaining under the exposed image-layer of photochromic material. The whole substrate then is cleared of the residual photochromic matter and, after the silicon oxide layer is regrown on the base silicon, in air or artificially by exposure to oxygen, the operation is repeated with another pattern, or the same pattern, as desired, to build up a second image. A second diffusion operation is performed to form a cooperating matrix design in the surface of the substrate. The micro-resolution of patterns obtainable by this process renders it most effective in the miniaturizing of integrated electronic components.

From the foregoing, it will be apparent that the amorphous condition of the photochromic material layer can be visually determined by a lack of cloudiness therein; that if difficulty is encountered in forming such a layer, because of crystallization, an impurity preferably selected from closely allied photochromic materials may be used to inhibit crystallization; that an amorphous layer may be deposited on a substrate from solution or by condensation thereon of a vapor phase; that a differential solubility is set up in an amorphous layer of photochromic material by differential application of ultraviolet radiation thereto by areas; that such amorphous photochromic layers have sufficient continuity to prevent permeation of etching liquids therethrough; that combinations of etching fluids, substrates, and photochromic materials may be selected to work in combination to produce new articles of manufacture; that the process of combining such materials is new; and that many variations may be provided in practicing the invention through choice of materials and selection of optional processing steps in combination.

In a companion application for United States Letters Patent Ser. No. 338,136 filed the same day by applicant, there is disclosed a further invention of stabilizing photochromic images made according to this invention by reversible chemical means to prevent thermal decay of such images and their re-establishment to a radiation-sensitive form.

This companion application to which reference has been made discloses the method of making photochromic images stable with respect to thermal decay which affects their color absorption characteristics, the stabilizing step being the exposure of such films to the action of halogen acid vapors. As applied to etching procedures, which is the subject of this application, such treatment is carried out to change the solubility characteristics of the exposed films, and such will be disclosed in various examples.

*Example VII*

An amorphous layer of photochromic material is laid down on a glass substrate (or any other kind of inert substrate) by the described method of drying a solution or by a sublimation of the material and condensation thereof onto the substrate, as by subliming the material in a vacuum chamber in which an artificially-cooled substrate is situated. An image is formed on the amorphous layer by use of controlled ultraviolet light and then the layer is subjected to the fumes of hydrochloric acid. Aromatic hydrocarbon solvents will wash away the background material and the residual light-unexposed molecules of the image area, to leave the image in the acid complex form of the photochromic material. The substrate then may be etched with agents to which the acid-complex image is resistant.

*Example VIII*

This is the same process as Example VII except that the amorphous layer of photochromic material is converted to the acid complex before the exposure-to-light step to form the image is performed.

*Example IX*

This is the same process as Example VIII except that after the exposure-to-light step the layer is exposed to the fumes of a base, such as $NH_3$, and the wash-off of the background material unexposed to light is accomplished with a liquid aliphatic hydrocarbon solvent.

*Example X*

In this example the amorphous layer of photochromic material is converted to the acid complex by exposure to the fumes of a halogen acid, the image then is formed thereon by exposure to the specified ultraviolet light, the exposed image portions of the layer are washed off with aqueous acid liquids, and the image may be used as a resist to etchants.

The broad subject matter of making thin amorphous photochromic layers, of making ultraviolet-radiation-induced images on the amorphous layers of photochromic materials held on substrates, and their manipulation as resists for various purposes, is claimed below.

Although Fischer's Base/salicylaldehyde condensation products of photochromic characteristics have been specified as fulfilling the purpose of the invention, such is not to be deemed restrictive as other similar compounds to the benzoindolinospiropyrans are useful, particularly those in which the 3-carbon atom is replaced with O or S.

What is claimed is:

1. A method of making a resist layer on a substrate of material, including the steps of
   (a) providing a solution of a spiropyran compound in a liquid solvent from which solution it may dry in a substantially amorphous state;
   (b) applying the solution to the substrate in a thin layer; and
   (c) drying the layer by evaporating the solvent, the spiropyran compound being selected from those having the following characteristics:
      (1) being dryable from solution in an amorphous substantially continuous film state, and
      (2) being converted to a more polar form by absorbing ultraviolet light, which changes its solubility so as to be no longer soluble in non-polar hydrocarbon solvents.

2. A process for forming image films on substrates including the steps of
   (a) forming a substantially amorphous solid film of a mixture of photochromic compounds of a spiropyran configuration with at least one compound of different molecular configuration so a dried residue of a liquid solution thereof does not form crystals by reason of the different molecular configurations, on a substrate from a solution thereof in a liquid solvent;
(b) forming an image in the film by applying light thereto in selected areas, thus converting the molecules of photochromic material of said areas to a more polar form in which they are no longer readily soluble in non-polar hydrocarbon solvents but are soluble in polar solvents; and
(c) washing away the unconverted molecules with a non-polar hydrocarbon solvent.

3. A process of etching including the steps of
(a) providing the material to be etched with a substantially amorphous thin film of photochromic material of a spiropyran configuration, the molecules of which are converted from a normal state in which they are readily soluble in non-polar hydrocarbon solvents to a state where they are not, by absorption of applied light;
(b) forming a desired image in the film, in terms of such differential solubility, by selective application thereto, by areas, of light;
(c) washing away the unconverted molecules with a non-polar hydrocarbon solvent to leave an image of photochromic material with a surrounding exposed substrate surface to be etched; and
(d) etching the substrate material by application thereto of an etching material to which the converted molecules provide a barrier.

4. The product of the process of claim 3.

5. The process of claim 3 in which the material to be etched is selected from the group consisting of glass and glass-like material.

6. The process of claim 3 in which the material to be etched is metallic.

7. The process of claim 3 in which the material to be etched is electrically conductive.

8. A process for etching, including the steps of
(a) providing an etchable surface of a base material with a substantially continuous solid amorphous thin film of photochromic material of a spiropyran configuration characterized by being impermeable to etching liquids of the class that form soluble salts with the base material, and also being characterized by being soluble in non-polar hydrocarbon liquid until irradiated with ultraviolet light whereupon it becomes substantially insoluble therein;
(b) forming an image in the film by directing an image-delineating ultraviolet light beam thereon to render such image portion substantially insoluble in the non-polar liquid hydrocarbon solvents;
(c) washing off the non-image portions of the film with a non-polar liquid hydrocarbon solvent; and
(d) etching the base material exposed by step (c) with a liquid etchant.

9. A process for etching as described in claim 8 with the added step of fixing the film by exposing it to the vapors of a hydrohalic acid, so the polar form thereof will not be subject to thermal decay.

10. A process for etching as described in claim 8 followed by removal of the residual photochromic material and repeating the process with a different image pattern.

11. The process of claim 10 in which the removal of the residual photochromic material is accomplished by washing it off with an aromatic hydrocarbon solvent.

12. A process for forming a resist image on a substrate of material to be protected, said resist image being in terms of a micro-thin continuous film of ultraviolet light-converted photochromic material of a spiropyran configuration, including the steps of
(a) laying down the photochromic material layer on the substrate by molecular deposit by means of a step taken from the class consisting of
(1) drying from solution, and
(2) condensation from a vapor state;
(b) forming an ultraviolet light-converted image on the deposit layer by selectively applying ultraviolet light thereto by areas;
(c) treating the deposit layer with fumes of a hydrohalic acid to form the acid complex of the whole layer, those areas only that were converted by light being soluble in aromatic hydrocarbon liquid solvents; and
(d) washing the deposit layer with liquid hydrocarbon solvent to remove the converted image area thereof, leaving the image in terms of exposed substrate material.

13. A process for forming a resist image on a substrate of material to be protected, said resist image being in terms of a micro-thin continuous film of ultraviolet light-converted photochromic material of a spiropyran configuration, including the steps of
(a) laying down the photochromic material layer on the substrate by molecular deposit by means of a step taken from the class consisting of
(1) drying from solution, and
(2) condensation from a vapor state;
(b) treating the deposit layer with fumes of a hydrohalic acid to form an acid-complex of the photochromic material;
(c) forming an image in the acid-complex layer by selective application of ultraviolet light, the combined effect of the acid fumes and the light together in the image layer making such area differentially soluble with respect to non-image areas, to aromatic hydrocarbon solvents; and
(d) washing the whole layer in aromatic hydrocarbon solvent to extract the image-portion of the layer, leaving the image in terms of exposed substrate material.

14. A process for forming a resist image on a substrate of material to be protected, said resist image being in terms of a micro-thin continuous film of ultraviolet light-converted photochromic material of a spiropyran configuration, including the steps of
(a) laying down the photochromic material layer on the substrate by molecular deposit by means of a step taken from the class consisting of
(1) drying from solution, and
(2) condensation from a vapor state;
(b) treating the deposit layer with fumes of a hydrohalic acid to form an acid-complex of the photochromic material;
(c) forming an image in the acid-complex layer by selective application of ultraviolet light, the combined effect of the acid fumes and the light together in the image layer making such area differentially soluble with respect to non-image areas, to aromatic hydrocarbon solvents;
(d) treat the exposed layer to fumes of $NH_3$ to convert the material to the base form; and
(e) washing off the background of the layer image with aliphatic hydrocarbon solvent.

15. A process for forming a resist image on a substrate of material to be protected, said resist image being in terms of a micro-thin continuous film of ultraviolet light-converted photochromic material of a spiropyran configuration, including the steps of
(a) laying down the photochromic material layer on the substrate by molecular deposit by means of a step taken from the class consisting of
(1) drying from solution, and
(2) condensation from a vapor state;
(b) treating the deposit layer with fumes of a hydrohalic acid to form an acid-complex of the photochromic material;

(c) forming an image in the acid-complex layer by selective application of ultraviolet light; and (d) washing off the image areas with an aqueous acid solution.

16. A process of treating a surface of silicon material that forms a silicon dioxide layer on exposure to oxygen as in air, including the steps of (a) forming a thin solid-state substantially amorphous layer of photochromic material of a spiropyran configuration, on the surface;

(b) forming an image in the layer with light;

(c) washing away the portion of the layer surrounding the image by a solvent that does not dissolve the image portion, to reveal the silicon dioxide surface therebeneath;

(d) treating the silicon dioxide surface so-revealed with hydrofluoric acid vapor to convert it to silicon tetrafluoride, thus revealing a silicon surface.

17. The process of forming a micro-precise image of metal on a substrate material resistant to metal etchants, including the steps of (a) laying down a thin metal layer on the substrate;

(b) forming a micro-thin substantially amorphous continuous solid layer of photochromic material of the indolino-benzopyran type on top of the metal layer which film normally is soluble in non-polar liquid hydrocarbon solvents;

(c) forming an image in layer (b) by subjecting it to a pattern of ultraviolet light and converting it thereby to a thermally decayable image which is during its existence resistant to the non-polar type of liquid hydrocarbon solvents;

(d) during the persistence of the image, washing away the unconverted background of the layer of photochromic film by use of non-polar hydrocarbon liquid solvents, to expose the metal therebeneath; and (e) applying an etchant to the image-protected metal layer to remove the metal except beneath the image layer.

18. The product of the process of claim 17.

19. The process of claim 17 followed by the step of removing the resist to leave the image on the substrate in terms of metal only.

20. A photo-sensitive image-forming device consisting of an electrically conductive substrate said substrate having coated on a surface thereof a continuous substantially amorphous solid state micro-thin film of photochromic material of a spiropyran configuration, said substrate being etchable by liquids that are resisted by light exposed areas of the film.

References Cited

UNITED STATES PATENTS 3,140,947 7/1964 Foris ------------------ 96—90

OTHER REFERENCES

"Theoretical and Experimental Investigation of Photochromic Memory Techniques and Devices: ASD Technical Report 61–70, #273512, TR 210, N37, National Cash Register Co., December 1961, pages 7–9, 336, 346–348.

NORMAN G. TORCHIN, *Primary Examiner.*

C. E. DAVIS, *Assistant Examiner.*